(12) United States Patent
Leavitt et al.

(10) Patent No.: US 9,534,738 B2
(45) Date of Patent: Jan. 3, 2017

(54) COMPOSITE PRESSURE TANK IDENTIFICATION AND TRACKING

(71) Applicant: Quantum Fuel Systems LLC, Lake Forest, CA (US)

(72) Inventors: Mark Leavitt, Laguna Hills, CA (US); Mark Warner, Foothill Ranch, CA (US); David Rea, Irvine, CA (US); Ketan Patel, Yorba Linda, CA (US); Yongkui Wen, Irvine, CA (US)

(73) Assignee: Quantum Fuel Systems LLC, Lake Forest, CA (US)

( * ) Notice: Subject to any disclaimer, the term of this patent is extended or adjusted under 35 U.S.C. 154(b) by 0 days.

(21) Appl. No.: 14/523,128

(22) Filed: Oct. 24, 2014

(65) Prior Publication Data
US 2016/0116115 A1   Apr. 28, 2016

(51) Int. Cl.
  *G06K 7/10*   (2006.01)
  *F17C 13/02*   (2006.01)
  *F17C 1/08*   (2006.01)

(52) U.S. Cl.
  CPC ............... *F17C 13/02* (2013.01); *F17C 1/08* (2013.01); *G06K 7/10376* (2013.01); *F17C 2203/011* (2013.01); *F17C 2203/066* (2013.01); *F17C 2203/0607* (2013.01); *F17C 2250/0486* (2013.01)

(58) Field of Classification Search
  CPC .......... B65B 3/04; H05H 1/38; G06K 10/077; G06K 19/07758; G06K 7/10; G06K 7/10019; G06K 19/07779

USPC ............... 340/10.1–10.6; 141/1, 94
See application file for complete search history.

(56) References Cited

U.S. PATENT DOCUMENTS

| 9,212,785 B2* | 12/2015 | Chaney | F17C 13/123 |
| 2008/0245676 A1* | 10/2008 | McManus | B65D 7/045 |
| 2009/0028001 A1* | 1/2009 | Andle | G01D 5/48 367/87 |
| 2012/0062245 A1* | 3/2012 | Bao | H01L 29/84 324/661 |
| 2013/0199660 A1* | 8/2013 | Cun | B60L 11/1838 141/1 |
| 2014/0102563 A1* | 4/2014 | Chaney | F17C 13/123 137/560 |

FOREIGN PATENT DOCUMENTS

| JP | 2002-181296 A | 6/2002 |
| JP | 2009-103213 A | 5/2009 |
| JP | 2010-242879 A | 10/2010 |
| JP | 2012-077780 A | 4/2012 |
| KR | 10-1056997 B1 | 8/2011 |

OTHER PUBLICATIONS

International Patent Application No. PCT/US2015/055395; Int'l Search Report and the Written Opinion; dated Jan. 18, 2016; 14 pages.

\* cited by examiner

*Primary Examiner* — Allen T Cao
(74) *Attorney, Agent, or Firm* — Baker & Hostetler LLP

(57) ABSTRACT

Disclosed is a device, system and methods for tracking conductive composite pressurized gaseous storage tanks. The system including anchoring an RFID device in a non-conductive blind boss. Wherein the anchor material has a low dielectric and has minimal reflection if RF energy.

20 Claims, 4 Drawing Sheets

COMPOSITE PRESSURE TANK IDENTIFICATION AND TRACKING

BACKGROUND

1. Field

This disclosure relates to a blind boss mounting for an insulated RFID tag connection tank.

2. General Background

There is an ongoing balance between safety and weight with respect to pressurized fuel in motor vehicles traditional methods of reducing tank weight have included using plastic lined tanks wrapped in fibers within a binding matrix and having a fluid connection for fill/unfill FIG. 1 shows a traditional composite tank structure. Such composite pressure vessels "T" is constructed by wrapping reinforcing fibers in a binding matrix forming a wrapped region "W" over a plastic liner "L". A polar boss "O" is connected to the liner and is partially in the wrappings. The boss has a fluid-connection "V" to the inside pressure chamber "I.V.". Fiber materials are often formed of carbon fibers or other conductive materials.

These composite tanks weight less than metal tanks but are more susceptible to damage from cuts, gashes and the like. Tanks are also susceptible to stress related to weather, fill and unfill sequence. Such tanks should be inspected upon regular intervals. Such tanks are also expensive and susceptible to theft. Finally, such tanks have projected and actual life cycles depending on use, damage and the like.

DISCLOSURE

Cylindrical pressurized carbon fiber filament wrapped composite cylinders are a light-weight alternative to metal tanks for storing gaseous fuels. Such cylinder can withstand hoop and axial stresses applied internally of at least a quantity equal to the burst rating.

Disclosed herein are exemplary implementations of aspects of devices, systems and methods of a pressurized-gas storage tanks wherein the tanks may be wirelessly tracked and identified. An identified tank may be "found" after theft. An identified tank which has previously been damaged may be identified as having prior damage for purposes of inspection and safety. An identified tank may be mapped to a location to arrange for inspection or to track assets. Signal communication to or from a Radio frequency identification (RFID) is a form of wireless communication that uses radio waves to identify and track objects RFID tags and like can be interfered with if the RFID tag is adjacent to or in contact with a conductive material or surface.

RFID tags are attached to items to be tracked. These tags an integrated circuit (IC), that is connected to an antenna. The tags in on board memory store the product's code or other identifier which can be read by a reader. An RFID reader is a device which can supply power via an antenna as well as data and commands to RFID tags. The reader and tag are in signal communications.

RFID systems can be further broken down by the frequency band within which they operate: low frequency, high frequency, and ultra-high frequency. There are also two broad categories of RFID systems-passive and active. The LF band covers frequencies from 30 KHz to 300 KHz. Typically LF RFID systems operate at 125 KHz, although there are some that operate at 134 KHz. This frequency band provides a short read range of 10 cm. The HF band ranges from 3 to 30 MHz. Most HF RFID systems operate at 13.56 MHz with read ranges between 10 cm and 1 m. HF systems experience moderate sensitivity to interference. The UHF frequency band covers the range from 300 MHz to 3 GHz. Systems complying with the UHF Gen2 standard for RFID use the 860 to 960 MHz band. While there is some variance in frequency from region to region, UHF Gen2 RFID systems in most countries operate between 900 and 915 MHz.

The read range of passive UHF systems can be as long as 12 m, and UHF RFID has a faster data transfer rate than LF or HF. UHF RFID is the most sensitive to interference.

In active RFID systems, tags have their own transmitter and power source. Usually, the power source is a battery. Active tags broadcast their own signal to transmit the information stored on their microchips, and offer a range of up to 100 m.

There are two main types of active tags: transponders and beacons. Transponders are "woken up" when they receive a radio signal from a reader, and then power on and respond by transmitting a signal back. Because transponders do not actively radiate radio waves until they receive a reader signal, they conserve battery life. Beacons are used in most real-time locating systems (RTLS), in order to track the precise location of an asset continuously. Unlike transponders, beacons are not powered on by the reader's signal. Instead, they emit signals at pre-set intervals. Depending on the level of locating accuracy required, beacons can be set to emit signals every few seconds, or once a day. Each beacon's signal is received by reader antennas that are positioned around the perimeter of the area being monitored, and communicates the tag's ID information and position.

In passive RFID systems, the reader and reader antenna send a radio signal to the tag. The RFID tag then uses the transmitted signal to power on, and reflect energy back to the reader.

Passive tags can be packaged in many different ways, depending on the specific RFID application requirements. For instance, they may be mounted on a substrate, or sandwiched between an adhesive layer and a paper label to create smart RFID labels. Passive tags may also be embedded in a variety of devices or packages to make the tag resistant to extreme temperatures or harsh chemicals.

An RFID reader, also known as an interrogator, is a device that provides the connection between the tag data and the system software that needs the information. The reader communicates with tags that are within its field of operation, performing any number of tasks including simple continuous inventorying, filtering (searching for tags that meet certain criteria), writing (or encoding) to selected tags.

It is appreciated by those skilled in the art that some of the circuits, components, and/or devices of the system disclosed in the present application are described as being in signal communication with each other, where signal communication refers to any type of communication and/or connection between the circuits, components, and/or devices that allows a circuit, component, and/or device to pass and/or receive signals and/or information from another circuit, component, and/or device. The communication and/or connection may be along any signal path between the circuits, components, and/or devices that allows signals and/or information to pass from one circuit, component. The signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs"), time-to-frequency conversations, frequency-to-time conversions, database mapping, signal processing steps, coding, modulations, demodulations, etc.

In some exemplary implementations, aspects disclosed are a tracking system for conductive material pressurized composite tanks, including a composite pressurized tank vessel having a plastic, non-carbon, boss with an open proximal end and a cavity within surrounded by an annular wall with an anchor material affixed therein and, an RFID device affixed within the anchor material.

In some exemplary implementations, aspects disclosed are a tracking system for conductive material pressurized composite tanks, including a composite pressurized tank vessel having a plastic, non-carbon, boss with an open proximal end and a cavity within surrounded by an annular wall with an RFID device within an anchor material affixed therein, an RFID device affixed within the anchor material; data stored in memory of the RFID device; an RFID reader in signal communication with the RFID device; and, whereby information stored in the memory of the RFID device is read. In some instances the data collected by the RFID reader is provided to one or more of a network and a server.

In the above implementations the blind boss may have one or more of a roughened internal annular wall, a coating added to the internal annular wall, threading on the annular wall, a prong in its cavity.

In the above implementations the blind boss may have one or more of an insert able end sleeve affixed to the internal annular wall partially within the cavity, and an insert able plug affixed to the internal annular wall.

In some exemplary implementations, aspects disclosed are an asset management system for conductive pressurized composite tanks including having a composite pressurized tank vessel with a plastic, non-carbon, blind boss with an open proximal end, a cavity, surrounded by an internal annular wall, an RFID device anchor material affixed within the blind boss; and, an RFID reader in signal communications with the RFID device. In some instance the RFID reader is in signal communications with a server via a network and provides the data collected from the RFID device to the server. The collected data may be provided from the server to a remote computing device.

In some exemplary implementations, aspects disclosed are an asset management system for conductive pressurized composite tanks including having a composite pressurized tank vessel with a plastic, non-carbon, blind boss with an open proximal end, a cavity, surrounded by an internal annular wall, an RFID device anchor material affixed within the blind boss; and, an RFID reader in signal communications with the RFID device. In some instance the RFID reader is in signal communications at about 15 meters. In some instance the RFID reader is in signal communications at about 10 meters. In some instance the RFID reader is in signal communications at about 5 meters In some exemplary implementations, aspects disclosed are an asset management system for conductive pressurized composite tanks including having a composite pressurized tank vessel with a plastic, non-carbon, blind boss with an open proximal end, a cavity, surrounded by an internal annular wall, an RFID device anchor material affixed within the blind boss; and, an RFID reader in signal communications with the RFID device. In some instance the RFID reader is in signal communications with a server via a network and provides the data collected from the RFID device to the server. In some instances an input devices contemporaneously with the RFID reader collect other data related to or arising from the tank, vehicle or location of the tank or vehicle including but not limited to one or more of a jpeg, mpeg, geographical location, temperature, vehicle ID, date and time, and, said input device provides said other data to the server via the network.

In some exemplary implementations, aspects disclosed are methods of tracking composite conductive pressurized tanks, the method including affixing an RFID device in a plastic, non-conductive, blind boss, with an anchor material, on a tank; store data in the memory of the RFID device; read the data stored with an RFID writer/reader; and, providing the collected data to a server via a network. In some instances the method includes using the RFID writer/reader to write data on the RFID device.

DRAWINGS

The above-mentioned features of the present disclosure will become more apparent with reference to the following description taken in conjunction with the accompanying drawings wherein like reference numerals denote like elements and in which:

FIG. 1 is a traditional composite tank;

FIG. 2 a composite tank with a blind boss;

Figure 1:
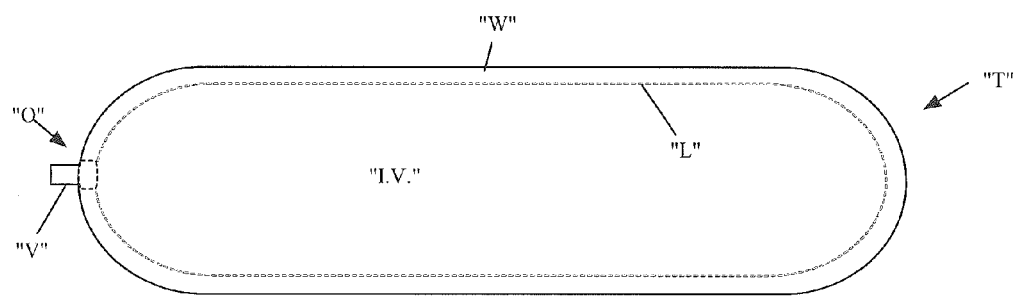

While the specification concludes with claims defining the features of the present disclosure that are regarded as novel, it is believed that the present disclosure's teachings will be better understood from a consideration of the following description in conjunction with the appendix, figures, in which like reference numerals are carried forward. All descriptions and callouts in the Figures are hereby incorporated by this reference as if fully set forth herein.

FURTHER DESCRIPTION

FIG. 1 illustrates a traditional composite pressurized gas vessel. These tanks are often used for the transport of natural gas or hydrogen fuel on vehicles to reduce weight the tanks are often composite layers and not metal. A traditional tank "T" comprises an internal volumetric space "I.V." defined by a plastic liner "L". The liner has an output neck "O" which fluidly connects the I.V. with the external world via a valve "V". The liner "L" is wrapped with material and resins "W" which form a boundary to the migration of gaseous fuels.

Figure 2:
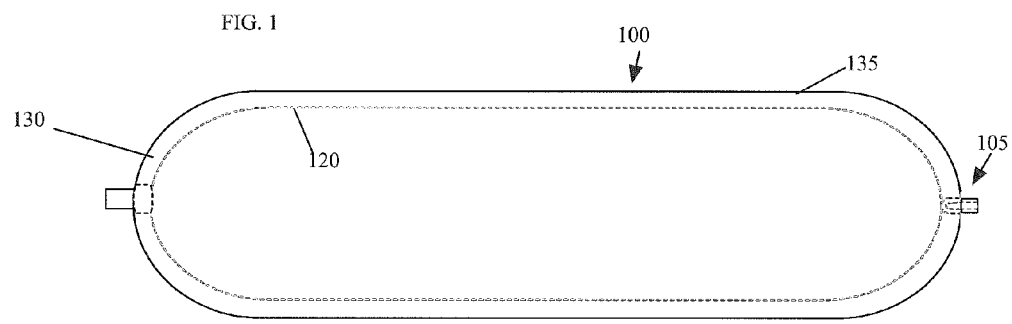
Figure 3:
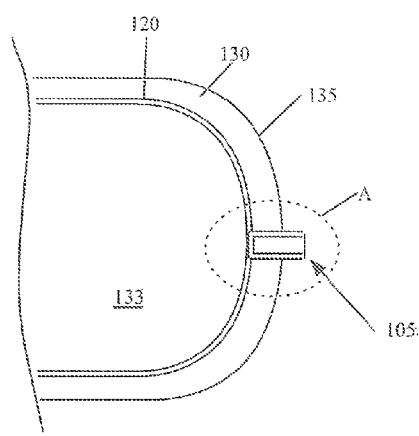
FIGS. 3 and 4 are close up of the blind boss in FIG. 2.
Figure 4:
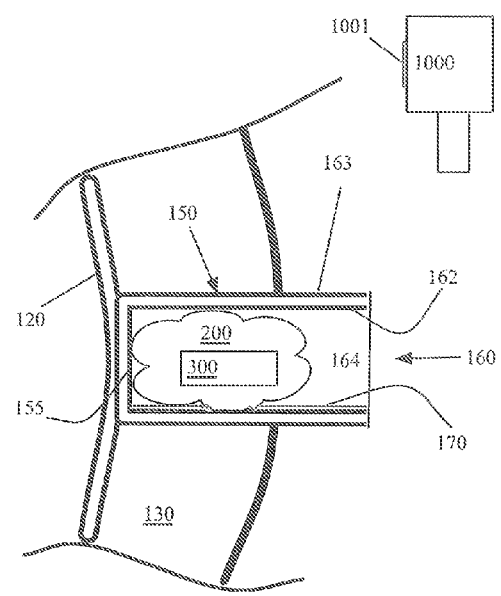

FIG. 2-4 illustrates aspects of composite pressurized gas tank 100 with a blind boss and tracking 105. The tank 100 is formed by a liner 120 surrounded by a wrapping region 130 which comprises a matrix of fabric in a binder such as an adhesive or resin which has been cured. An interior volumetric space 133 is defined by the liner. The exterior of the tank 135 may be further wrapped in protective material (not shown). The wrapping region, utilizes fiber materials such as carbon fiber, KEVLAR™ fiber, glass fiber, and/or other fiber type materials in a matrix binder to form a strong, burst resistant, lightweight tank. However, carbon fiber is conductive and testing has shown it to interfere with radio frequency transmission and reception.

The blind boss 150 disclosed herein is formed as part of the non-carbon plastic liner, or it is added to the end of a carbon plastic liner but formed of non-carbon plastic. The blind boss has a closed distal end 155 and an open proximal end 160 and internal annular wall 162 and external annular wall 163, an internal cavity 164. Within the blind boss an anchor material 200 which does not interfere with communications to or from a RFID device is added along with the RFID 300 device.

RFID device contains memory which contains data. Data may be coding to identify the tank, the origin, the date of service. The RFID device may contain at least one of non-volatile memory, read only memory, writable memory. Those of ordinary skill in the art will recognize that RFID devices are writeable. Materials which do not interfere have low dielectric properties such as plastic (non-carbon) and epoxy, acrylic or silicon sealants. The anchor material should be surround at least a portion of the RFID device and adhere to the internal annular wall 162 of the cavity 164. An RFID reader 1000 wirelessly reads the information on the RFID tag/device which may include unique identifier numbers, manufacture information and hours of service. RFID readers may also be writers and using software such as LLRP (Low Level Reader Protocol) a UHF RFID can write to the RFID device. Geo location may also be acquired along with other relevant data and meta data such as vehicle tank is on duty on, tank manufacture, temperature, fill history, visual inspection etc.

An RFID reader 1000 wirelessly reads the information on the RFID tag/device which may include unique identifier numbers, manufacture information and hours of service. Geo location may also be acquired along with other relevant data and meta data such as vehicle tank is on duty on, tank manufacture, temperature, fill history, visual inspection etc.

In some instance the annular wall 162 may be roughened prior to the insertion of the anchor material to provide a rougher surface for the anchor material to adhere to. In some instances at least a portion of the annular wall may be coasted with an additional anchor material 170. The additional material may be an insulator, a shock absorber, an adhesive or the like.

The RFID device, and in particular the antennae, is sensitive to interference. The greater the radio interference the lower the performance. Low dielectric materials generally do not reflect RF energy and thus have a lower impact on performance of n RFID device than a high dielectric material. Low dielectric materials include non-carbon plastic High dielectric materials tend to reflect more RFID energy and therefore detune a RFID.

Figure 5:
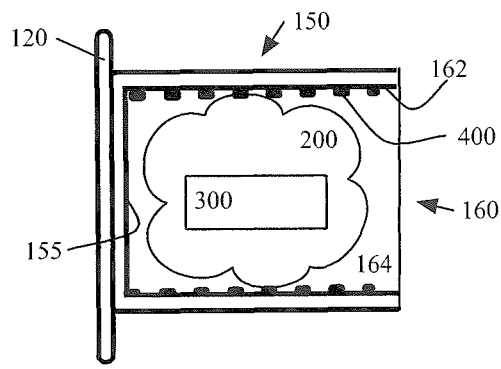
FIG. 5-9 are alternate configurations of blind boss structure.
Figure 6:
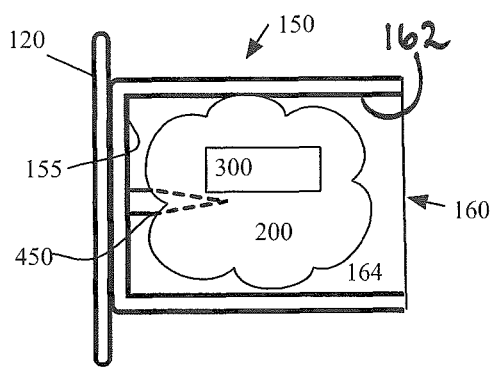

FIG. 5 illustrates a blind boss 150 within a cavity 164 wherein the cavity is threaded 400 on the internal annular wall 162. The threading provides an undercut wherein the anchor material may be caught to better hold the RFID device 300 within the anchor material. FIG. 6 illustrates aspects of a blind boss with a prong 450 extending from the closed end 155 of the blind boss and into the cavity 164. The prong 450 is constructed of a low or non-conductive material, to avoid interference with the RFID device. The prong is preferable formed with the blind boss. Those of ordinary skill in the art with recognize that a single prong may be replaced with multiple prongs without departing from the scope of this disclosure. The anchor material surrounds at least part of the prong 450 thereby further anchoring the material to another point. The surface of the prong may be roughened to urge greater adherence.

Figure 7:
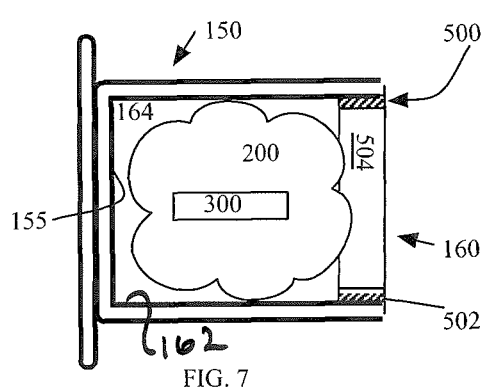

FIG. 7 teaches an insertable end sleeve 500 which may be added to a blind boss 150 and affixed to the internal annular wall 162 partially within the cavity 164. The end sleeve 500 effectively reduces the diameter of the open proximal end 160 of the blind boss. Shown here the end sleeve is of a size and shape to mate with the internal annular wall for the blind boss. The end sleeve is hoop shaped with a predetermined thickness 502 and forming a hoop annular wall 504. Those of ordinary skill in the art will recognize that it is within the disclosure that the sleeve thickness may be larger and may also extend as a solid end blocking the entire opening to the blind boss.

Figure 8:
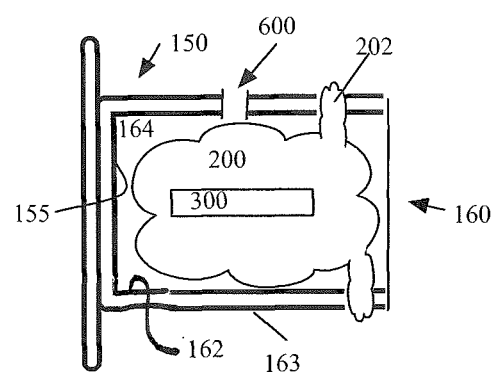

FIG. 8 illustrates a blind boss 150 with passageways 600 fluidly communicating between the cavity and the external annular wall 163. Portions of the anchor material 202 are shown affixed within the passageways to further anchor the RFID device during mounting.

Figure 9:
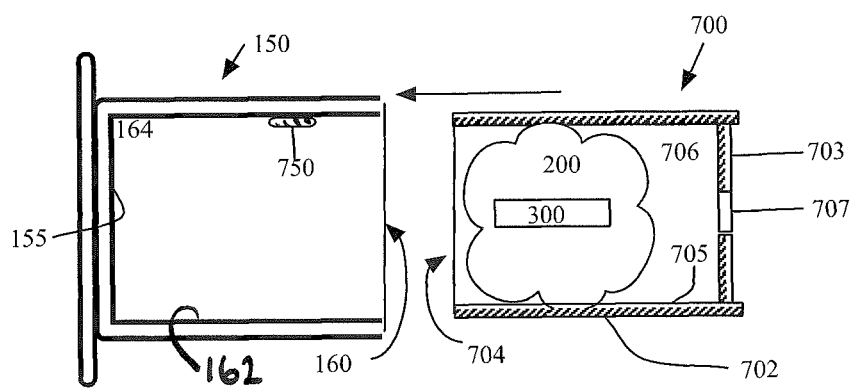

FIG. 9 illustrates an assembly view of an insertable anchored RFID device. A plug 700 which is at least a hollow shape having an external wall 702 corresponding to the blind boss's internal annular wall 162, at least a partial end cap 703, an open end 704, and an internal wall 705 forming a cavity 706 wherein the anchor material 200 is surrounding an RFID device 200. An air and humidity passage 707 may be included. After placing the anchor material and RFID device in the plug 700, an adhesive or cement 750 is placed on at least one of the external wall of the plug and the internal annular wall of the cavity 164. The plug is then slid into the blind body thereby affixing the RFID device therein.

Figure 10:
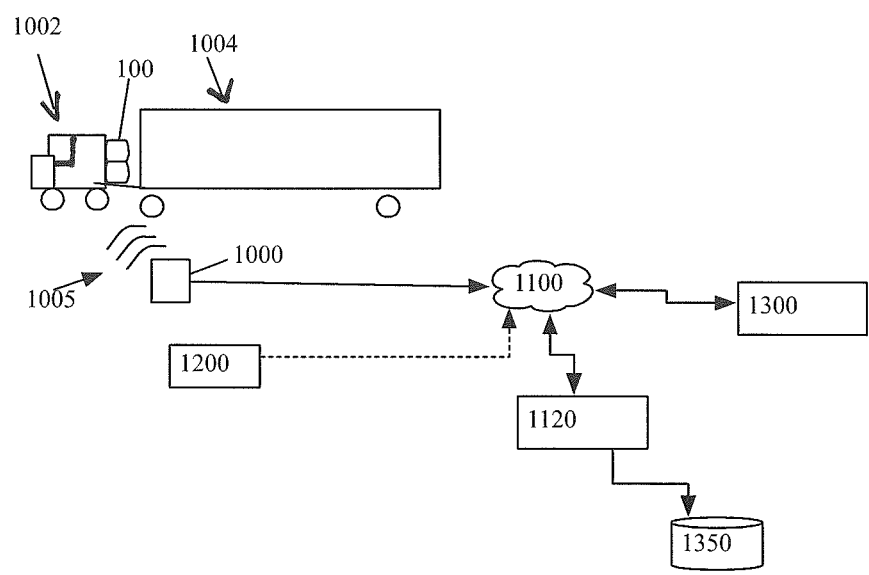
FIG. 10 shows an overview of a computerized tracking system.

FIG. 10 is an overview of a tracking system wherein a tractor 1002 and trailer 1004 with gaseous fuel tanks 100 having an RFID device 300 within a blind boss 150 being wirelessly interrogated for information via a RFID reader 1000. The RFID reader 1000 is in signal communication 1005 with the RFID device in the tank 100. The RFID reader is also in signal communication with a network 1100 wherein the information collected from the RFID device is provided to a server 1120. The information may be stored in a database 1150. The server 1120 may also parse the information and provide at least some of the information to computing devices a remote such as smart phones and computers to track the tank and vehicle location or provide notification to the vehicle owner or driver regarding the tank. In some instances the server uses decision and rule engines to parse data for use in tracking at least one of tracking a tank's location, a vehicle location, temperature when the tank was identified at a location, elevation when the tank was identified at a location, date when the tank was a t allocation, damage on the tank at a location and providing a subset of that data to another computing device.

Additionally, other input devices or sensors 1200 which may contemporaneously with the RFID reader 1000 interrogating the tank, collect other data such as jpeg, mpeg, geographical location, temperature, vehicle ID, visual inspection on the and optionally any other sensors or input device 1200. In some instances the other input device or sensor may be integrated into the RFID writer/reader. The data provided to the server 1120 may be stored in a database 1350. That data or metadata may be sent to the server 1120 and collected and correlated to a specific tank or vehicle.

Additionally, other input devices or sensors including cameras and the like, 1004 may contemporaneously with the RFID reader interrogating the tank, collect other data such as jpeg, mpeg, geographical location, temperature, vehicle ID, visual inspection on the and optionally any other sensors or input device 1004. That data or metadata may be sent to the server 1020 and collected and correlated to a specific tank.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A tracking system for conductive material pressurized composite tanks, the system comprising:
   a composite pressurized tank vessel (100) comprising;
      a plastic liner (120) surrounded by a wrapping region (130);
      an interior volumetric space (133);
   a plastic, non-carbon, blind boss (150) with a closed distal end (155) and an open proximal end (160) wherein the closed distal end is affixed to the liner;
   a cavity (164) in the blind boss surrounded by an annular wall (162);
   an anchor material (200) affixed within the cavity of the blind boss; and,
   an RFID device affixed within the anchor material.

2. The tracking system for conductive material pressurized composite tanks of claim 1 further comprising:
   data stored in memory in the RFID device;
   an RFID reader in signal communication with the RFID device; and,
   whereby information stored in the memory of the RFID device is read.

3. The tracking system for conductive material pressurized composite tanks of claim 1 wherein the blind boss further compromises a roughened internal annular wall (162).

4. The tracking system for conductive material pressurized composite tanks of claim 1 wherein the blind boss is threaded on its internal annular wall.

5. The tracking system for conductive material pressurized composite tanks of claim 1 further comprising a prong (450) in its cavity.

6. The tracking system for conductive material pressurized composite tanks of claim 1 further comprising an insertable end sleeve (500) affixed to the internal annular wall partially within the cavity; and,
   whereby the sleeve effectively reduces the diameter of the open proximal end of the blind boss.

7. The tracking system for conductive material pressurized composite tanks of claim 1 further comprising an insertable plug (700) affixed to the internal annular wall 162 partially within the cavity; and,
   whereby the plug contains the anchor material and the RFID device.

8. The tracking system for conductive material pressurized composite tanks of claim 1 further comprising a coating of additional anchor material (170) on the internal annular wall.

9. The tracking system for conductive material pressurized composite tanks of claim 2 wherein the RFID reader provides the information read from the RFID device to a network (1100).

10. An asset management system for conductive pressurized composite tanks, the system comprising:
   a composite pressurized tank vessel (100) comprising;
      a plastic liner (120) surrounded by a wrapping region (130);
      an interior volumetric space (133);
   a plastic, non-carbon, blind boss (150) affixed at its closed distal end to the liner having an open proximal end (160) and a cavity (164) surrounded by an internal annular wall (162);
   an anchor material (200) affixed within the cavity of the blind boss;
   an RFID device affixed within the anchor material; and,
   an RFID reader (1000) in signal communications with the RFID device.

11. The asset management system for conductive pressurized composite tanks, of claim 10 wherein the RFID reader is in signal communications with a server (1120) via a network (1100) and provides the data collected from the RFID device to the server.

12. The asset management system for conductive pressurized composite tanks, of claim 11 wherein the RFID reader is in signal communications with the RFID device at a distance of up to about 5 meters.

13. The asset management system for conductive pressurized composite tanks, of claim 11 wherein the RFID reader is in signal communications with the RFID device at a distance of up to about 10 meters.

14. The asset management system for conductive pressurized composite tanks, of claim 11 wherein the RFID reader is in signal communications with the RFID device at a distance of up to about 15 meters.

15. The asset management system for conductive pressurized composite tanks, of claim 11 wherein the server parses the data provided and provides at least some of that data to a remote computing device (1300).

16. The asset management system for conductive pressurized composite tanks, of claim 10 further comprising:
   an input devices 1200 which contemporaneously with the RFID reader 1000 collect other data including but not limited to one or more of a jpeg, mpeg, geographical location, temperature, vehicle ID, date and time; and,
   said input device provides said other data to the server via the network.

17. A method of tracking composite conductive pressurized tanks, the method comprising:
   affixing or forming a blind boss with an open cavity to the plastic liner of a composite pressurized tank;
   affixing an RFID device in the cavity with an anchor material; storing data in the memory of the RFID device;
   reading the data stored with an RFID writer/reader; and,
   providing the collected data to a server via a network.

18. The method of claim 17, the method further comprising using the RFID writer/reader to write data on the RFID device.

19. The method of claim 17, the method further comprising using a input device to contemporaneously with the reading of the RFID device data, provide other data to a network; and,
   wherein the other data is at least one of as jpeg, mpeg, geographical location, temperature, vehicle ID, visual inspection.

20. The method of claim 17, wherein the anchor material has a low-dielectric.

* * * * *